United States Patent Office 3,730,756
Patented May 1, 1973

3,730,756
METHOD OF PRODUCING COBALT-COATED COMPOSITE POWDER
Wasyl Kunda and Donald Alan Randell, Fort Saskatchewan, Alberta, Canada, assignors to Sherritt Gordon Mines Limited, Toronto, Ontario, Canada
No Drawing. Filed Apr. 28, 1971, Ser. No. 138,313
Int. Cl. C23c 3/04
U.S. Cl. 117—47 R     4 Claims

ABSTRACT OF THE DISCLOSURE

Finely divided core particles are dispersed in a nickel-containing ammoniacal solution and the solution is subjected to gas reduction to deposit a thin layer of nickel on the particles. The nickel-coated particles are then separated from solution and contacted with a cobalt-containing ammoniacal solution. A layer of cobalt is deposited over the nickel coating by subjecting the solution to gas reduction.

---

This invention relates to a cobalt-coated composite powder and to a method of producing such powder. The powder with which the invention is chiefly concerned has a central core encased in a layer composed of nickel. The nickel-layer is surrounded by a layer of cobalt. The particular method to which the invention is related involves precipitation and deposition of a layer of metallic nickel on the core material by gas reduction from solution after which cobalt is deposited on the nickel coated particles also by gas reduction from solution.

Composite powders are widely used in industry as such or in the form of compacts. They are used, for example, in the powder metallurgy field and in alloys employed in the manufacture of special metal parts. The powders may be produced by spraying or sputtering the metals of interest at a temperature above the melting temperature, by mechanical attrition or by mechanically milling powders. One method in commercial use for the production of certain composite powders involves dispersing solid particles of material which is to form the core of the powders in an ammoniacal metal salt solution. The solution contains a dissolved salt of a metal which can be precipitated from the solution as a metal powder by reaction with a reducing gas at elevated temperature and pressure. The metals which form such soluble salts are those of the group: cobalt, nickel, ruthenium, rhodium, osmium, iridium, gold, silver, platinum, palladium, copper, arsenic, tin and cadmium. Usually the soluble salts are of the group: nickel, cobalt, copper and silver. The temperature of the solution containing the core particles in suspension is increased to above about 250° F. and reducing gas is fed into the solution under pressure. The reducing conditions at elevated temperature and pressure cause the metal of the soluble salt to precipitate and deposit on the core particles as a thin coating and the composite powder is separated from solution.

The production of cobalt-coated particles poses serious technical problems. Cobalt precipitated from an ammoniacal solution will not adhere to many core materials suspended in the solution. Other core materials will only accept an incomplete, spotty coating of cobalt. For example, non-metallic particles such as calcium fluoride cannot be uniformly coated by cobalt by this method. When cobalt is precipitated from an ammoniacal solution containing suspended particles of calcium fluoride, the resulting particles will have cobalt granules disseminated randomly about the outer surface. However, most of the outer surface of the particles will be completely free of cobalt.

It is therefore an object of the present invention to provide a method by which cobalt dissolved in solution as a salt may be caused to precipitate and deposit as a uniform coating on a core material.

It is a further object to provide a method by which a core material is encased in a layer of nickel to which precipitated cobalt readily adheres before cobalt is caused to precipitate on the composite powder.

A still further object is to provide a powder composition having a central core composed of material other than nickel, an inner layer composed of nickel and an outer layer composed of cobalt.

These and other objects may be accomplished by a method which broadly involves the steps of forming a slurry of a core material suspended in an ammoniacal solution containing dissolved nickel values. The slurry is passed to a reaction vessel, such as an autoclave and is reacted with a reducing gas at elevated temperature and under a pressure of reducing gas above the pressure autogenously generated by the temperature at which the reaction is conducted in other precipitate metallic nickel from solution and coat the core particles therewith. At the end of the reduction period, the nickel-coated core particles are contacted with an ammoniacal solution containing a soluble cobalt salt. The resulting slurry is reacted at elevated temperature and pressure with a reducing gas to cause the desired amount of cobalt to precipitate and deposit on the composite powder as a uniform coating. The cobalt coated powder is then separated from solution.

The resulting powder composition comprises a central core, an inner layer composed of nickel and an outer layer composed of cobalt.

The core of the cobalt coated composite powders of the present invention may be any metals or non-metals which can be coated with nickel. Examples of suitable metals are copper, silver, aluminium, titanium, tin, lead. Suitable non-metals include refractory oxides, carbon in any of its crystal forms, nitrides, borides, metal oxides such as alumina, thoria, zirconia, titania and silica. Also, ceria, chromium oxide, uranium oxide, vanadium oxide and calcium fluoride may form the core material.

It is preferred to pre-treat the core particles with an activation agent prior to the reduction reaction. The core particles are immersed in a solution containing the activation agent, then separated from solution by for example, filtering. The activation agent serves to promote the reducing reaction and the precipitation of the nickel on the core particle. Suitable activation agents include soluble salts of the precious metals silver, gold, palladium and platinum. The most effective salt for this purpose is palladium chloride.

According to the process, particles of the core material are dispersed in a nickel-containing ammoniacal solution in an autoclave. Any solution in which the core particles remain undissolved is suitable provided nickel values to be precipitated are soluble therein. Usually the solution will be aqueous ammoniacal ammonium carbonate, ammonium sulphate or mixtures thereof. The particles of the core material should be of a size that they will remain in the form of a suspension in the solution.

The reducing gas also is selected with regard to all factors entering into the reducing reaction. Usually, it will be desired to precipitate metals from the solution substantially free from impurities. It is preferred to employ hydrogen as the reducing agent in the precipitation of pure or substantially pure nickel from the solution.

The reducing reaction usually is conducted at a temperature above 250° F. and preferably within the range of from about 300° F. to about 400° F. The total pressure at which the reaction is conducted is determined by the pressure autogenously developed by the temperature plus the partial pressure of the reducing gas. The reaction can be conducted under a partial pressure of reducing gas of as low as about 50 lbs. per square inch but it proceeds slowly. At higher pressures, the reaction takes place more rapidly. A preferred partial pressure of reducing gas is within the range from about 100 to 500 lbs. per square inch. Higher temperatures and pressures can be employed but the increased reaction rate obtained does not warrant the increased capital and operational costs inherent in the use of high pressure equipment.

Provided the core particles are uniformly coated with nickel, the composite particles can be readily coated with cobalt. A nickel coating of about 1 to 2 microns forms a satisfactory base upon which cobalt will readily precipitate. It is generally found desirable to adjust the concentration of the nickel in solution according to the desired quantity of nickel deposited on the core particles. Under normal conditions, dissolved nickel values in the ammoniacal solution can be decreased to about 1 gram per litre very easily. Thus it is only necessary to add to the solution a slight excess of soluble nickel values over the amount of nickel desired to be precipitated, generally about 1 gram per litre. For example, to produce a composite powder composed of 80% core particles by weight and 20% nickel coating by weight, a given amount of core material, e.g. 100 grams is suspended in a nickel-containing solution. The solution should contain one-quarter as much dissolved nickel, i.e., 25 grams plus an additional 1 gram per litre.

It is important to adjust the concentration of the nickel in the solution such that there is rapid precipitation of nickel values from the solution. The concentration must be below that at which crystallization of the nickel values occurs. Where the nickel values are in the form of nickel sulphates, the concentration of the sulphates should be between 25 and 75 grams per litre. Preferably, the concentration should be maintained at about 50 grams per litre.

The reaction is complete when the consumption of hydrogen ceases, usually after 15 to 30 minutes from commencement at the preferred operating conditions. The resulting composite nickel coated particles are then separated from solution such as by filtration or centrifuging. The separated coated particles are then contacted with a cobalt-containing ammoniacal ammonium sulphate solution.

The procedure for coating the nickel-coated core particles with cobalt is similar to the procedure outlined above for coating the core particles. The slurry composed of the nickel-coated particles and cobalt-containing ammoniacal ammonium sulphate solution is reacted at elevated temperature and pressure with a reducing gas to cause the desired amount of cobalt to precipitate on the nickel-coated particles. The temperature of the slurry during the reducing reaction is preferably maintained at between 300°–400° F. and the preferred partial pressure of reducing gas is between about 300 and about 400 p.s.i. The concentration of the cobalt in the ammoniacal ammonium sulphate solution should be between 25 and 75 g.p.l. At higher concentrations undesirable crystallization of the cobalt salt occurs.

The amount of cobalt deposited on the nickel-coated core particles is controlled according to the composition of the core metal and the use to which the finished particles are to be put. For example, it is desirable to deposit a relatively thin layer of cobalt on nickel-coated carbide particles. On the other hand it is frequently desirable to coat composite particles having metallic cores such as copper, silver and aluminum, with a somewhat thicker layer of cobalt. To build up the thickness of the cobalt coating on composite powders, a so-called "densification" procedure may be used. This procedure involves carrying out a series of batch reductions of the composite powder in the cobalt-containing ammoniacal solution. After each reduction, the reduced solution is replenished with a fresh cobalt-containing solution. The cobalt-coated powder remains in the reaction vessel during the reduction operation to allow the cobalt coating to build up to the required thickness.

After the desired amount of metallic cobalt has deposited on the composite powder, the reduction reaction is discontinued and the resulting cobalt-coated powder product is separated from solution.

In the following example the result of pre-coating a core material with nickel before cobalt precipitation is compared with the result when the precoating step is omitted. In the first test, calcium fluoride, inactive to coating with cobalt, was dispersed in an ammoniacal solution containing dissolved cobalt. The ammoniacal solution was subjected to reducing conditions to precipitate the cobalt. In the second test, the core was first coated with nickel before being dispersed in the cobalt-containing ammoniacal solution. Since calcium fluoride does not react with an ammoniacal solution containing dissolved nickel unless an activation agent is provided, the calcium fluorides sample used in both tests was pre-treated with palladium chloride.

TEST I 595 grams calcium fluoride powder, 100% minus 100 mesh standard Tyler screen in size, was treated with 10 mls. of a solution containing 5 g.p.l. palladium chloride. The water was filtered off and the wet cake was charged into an autoclave with 2.5 litres of a cobalt sulphate solution containing 50 g.p.l. Co, and 33 g.p.l. $NH_3$. The $NH_3$/Co molar ratio was 2.3. The charge was heated to 375° F. and hydrogen under an over-pressure of 350 p.s.i.g. was sparged into the autoclave. After two hours, the autoclave was cooled and the contents discharged. No deposition of cobalt on the calcium fluoride powder was observed.

TEST II 130 grams of the calcium fluoride powder from the first test was placed in an autoclave with 2.5 litres of nickel solution containing 20 g.p.l. Ni and 12 g.p.l. ($NH_3$/Ni molar ratio of 2.0) and 65 g.p.l. ammonium sulphate. The charge was heated to 350° F., and hydrogen under an over-pressure of 350 p.s.i.g. was sparged into the autoclave.

After 30 minutes, the autoclave was cooled and the solution was discharged. The calcium fluoride particles were completely coated with nickel. This intermediate product was charged again into a 3-gallon autoclave with 8 litres Co solution containing 42 g.p.l. Co, 28 g.p.l. $NH_3$ ($NH_3$/Co molar ratio of 2.3) and 350 g.p.l. ammonium sulphate.

After 60 minutes, the material was discharged from the autoclave. The calcium fluoride particles pre-coated with nickel were observed to be covered with reduced cobalt.

In order to build up the cobalt coating to a desired thickness, the particles were subjected to five "densification" reduction operations in the autoclave. The final product contained (percent weight):

$CaF_2$=25%
Ni=10%
Co=65%

It is clear that pretreatment of calcium fluoride with palladium chloride fails to cause the cobalt to form a coating on the calcium fluoride particles. When the calcium fluoride is first coated with nickel, the cobalt precipitates on the coated calcium fluoride particles.

What we claim as new and desire to protect by Letters Patent of the United States is:

1. A method of producing a cobalt-coated composite powder which comprises: providing solid particles of a core material which when dispersed in an ammoniacal solution reacted with a reducing gas at elevated temperature and under a positive partial pressure will be completely coated with nickel when said solution contains dissolved nickel values but will be incompletely or not at all coated with cobalt when said solution contains dissolved cobalt values; dispersing said core particles in an ammoniacal solution which contains dissolved nickel values; reacting the solution with a reducing gas at a temperature above about 250° F. and under a positive partial pressure of reducing gas to precipitate from solution only sufficient metallic nickel to completely coat said core particles therewith; separating the composite nickel particles from said solution; contacting said composite particles with a second ammoniacal solution which contains dissolved cobalt values; reacting the second solution with a reducing gas at a temperature above about 250° F. and under a positive partial pressure of reducing gas to precipitate and deposit a layer of metallic cobalt on said composite particles; and separating said cobalt-coated composite particles from said second solution.

2. A method of producing a cobalt-coated composite powder which comprises: providing solid particles of a core material which when dispersed in an ammoniacal solution reacted with a reducing gas at elevated temperature and under a positive partial pressure will be completely coated with nickel when said solution contains dissolved nickel values but will be incompletely or not at all coated with cobalt when said solution contains dissolved cobalt values; dispersing said core particles in an ammoniacal solution chosen from the group comprising ammonium carbonate, ammonium sulphate and mixtures thereof, said solution containing dissolved nickel values; reacting the solution with a reducing gas at a temperature above about 250° F. and under a positive partial pressure of reducing gas to precipitate from solution only sufficient metallic nickel to completely coat said core particles therewith; separating the composite nickel particles from said solution; contacting said composite particles with a second ammoniacal solution composed of ammonium sulphate and dissolved cobalt values; reacting said second solution with a reducing gas at a temperature above about 250° F. and under a positive partial pressure of reducing gas to precipitate and deposit a layer of metallic cobalt on said composite particles; and separating said cobalt-coated composite particles from said second solution.

3. A method of producing a cobalt-coated composite powder which comprises: providing solid particles of a core material which when dispersed in an ammoniacal solution reacted with a reducing gas at elevated temperature and under a positive partial pressure will be completely coated with nickel when said solution contains dissolved nickel values but will be incompletely or not at all coated with cobalt when said solution contains dissolved cobalt values; dispersing said core particles in an ammoniacal solution chosen from the group comprising ammonium carbonate, ammonium sulphate and mixtures thereof, said solution containing dissolved nickel values; reacting the solution with a reducing gas at a temperature between about 300 and about 400° F. and under a positive partial pressure of reducing gas of about 100 to about 500 lbs. per square inch to precipitate from solution only sufficient metallic nickel to completely coat said core particles therewith; separating the composite nickel particles from said solution; contacting said composite particles with a second ammoniacal solution composed of ammonium sulphate and dissolved cobalt values; reacting said second solution with a reducing gas at a temperature between about 300° and 400° F. and under a positive partial pressure of reducing gas of about 300 to about 400 p.s.i. to precipitate and deposit a layer of metallic cobalt on said composite particles; and separating said cobalt-coated composite particles from said second solution.

4. A method of producing a cobalt-coated composite powder which comprises: providing solid particles of a core material which when dispersed in an ammoniacal solution reacted with a reducing gas at elevated temperature and under a positive partial pressure will be completely coated with nickel when said solution contains dissolved nickel values but will be incompletely or not at all coated with cobalt when said solution contains dissolved cobalt values; treating said core particles with an aqueous solution containing an activating agent comprising a salt of a precious metal chosen from the group silver, gold, palladium and platinum; separating the so-treated particles from said solution; forming a slurry of said so-treated particles in an ammoniacal solution chosen from the group comprising ammonium carbonate, ammonium sulphate and mixtures thereof; said solution containing dissolved nickel values; reacting the slurry with a reducing gas at a temperature above about 250° F. and under a positive partial pressure of reducing gas to precipitate from solution only sufficient metallic nickel to completely coat said core particles with metallic nickel; separating the composite nickel particles from said solution; contacting said composite particles with a second ammoniacal solution composed of ammonium sulphate and dissolved cobalt values; reacting said second solution with a reducing gas at a temperature above about 250° F. and under a positive partial pressure of reducing gas to precipitate and deposit a layer of metallic cobalt on said composite particles; and separating said cobalt-coated particles from said second solution.

References Cited

UNITED STATES PATENTS

| | | | |
|---|---|---|---|
| 2,853,403 | 9/1958 | Mackiw et al. | 117—100 M |
| 2,398,132 | 4/1946 | Cottrell | 75—212 X |
| 3,556,839 | 1/1971 | Roy | 117—100 B |
| 2,853,398 | 9/1958 | Mackiw et al. | 117—100 BX |
| 2,853,401 | 9/1958 | Mackiw et al. | 117—100 B |
| 3,062,680 | 11/1962 | Meddings | 117—100 B |
| 3,218,192 | 11/1965 | Meddings et al. | 117—100 B |
| 1,822,426 | 9/1931 | Welch | 117—100 MX |
| 2,870,339 | 1/1959 | Birden | 117—100 BX |
| 3,355,317 | 11/1967 | Keith et al. | 117—100 B |

ALFRED L. LEAVITT, Primary Examiner

J. R. BATTEN, Jr., Assistant Examiner

U.S. Cl. X.R.

75—212; 117—50, 71 R, 71 M, 100 B, 100 M, 160 R